Patented June 11, 1946

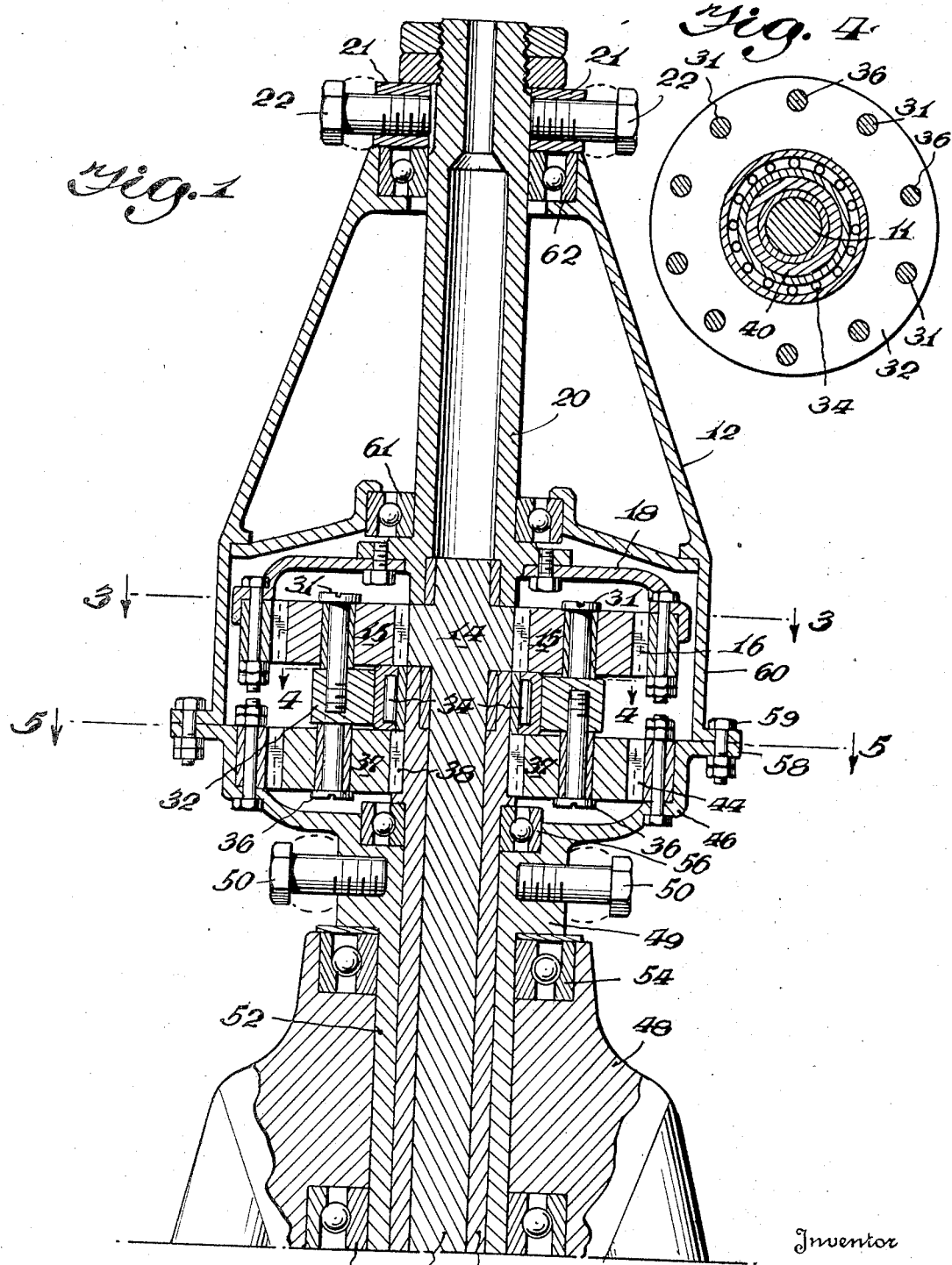

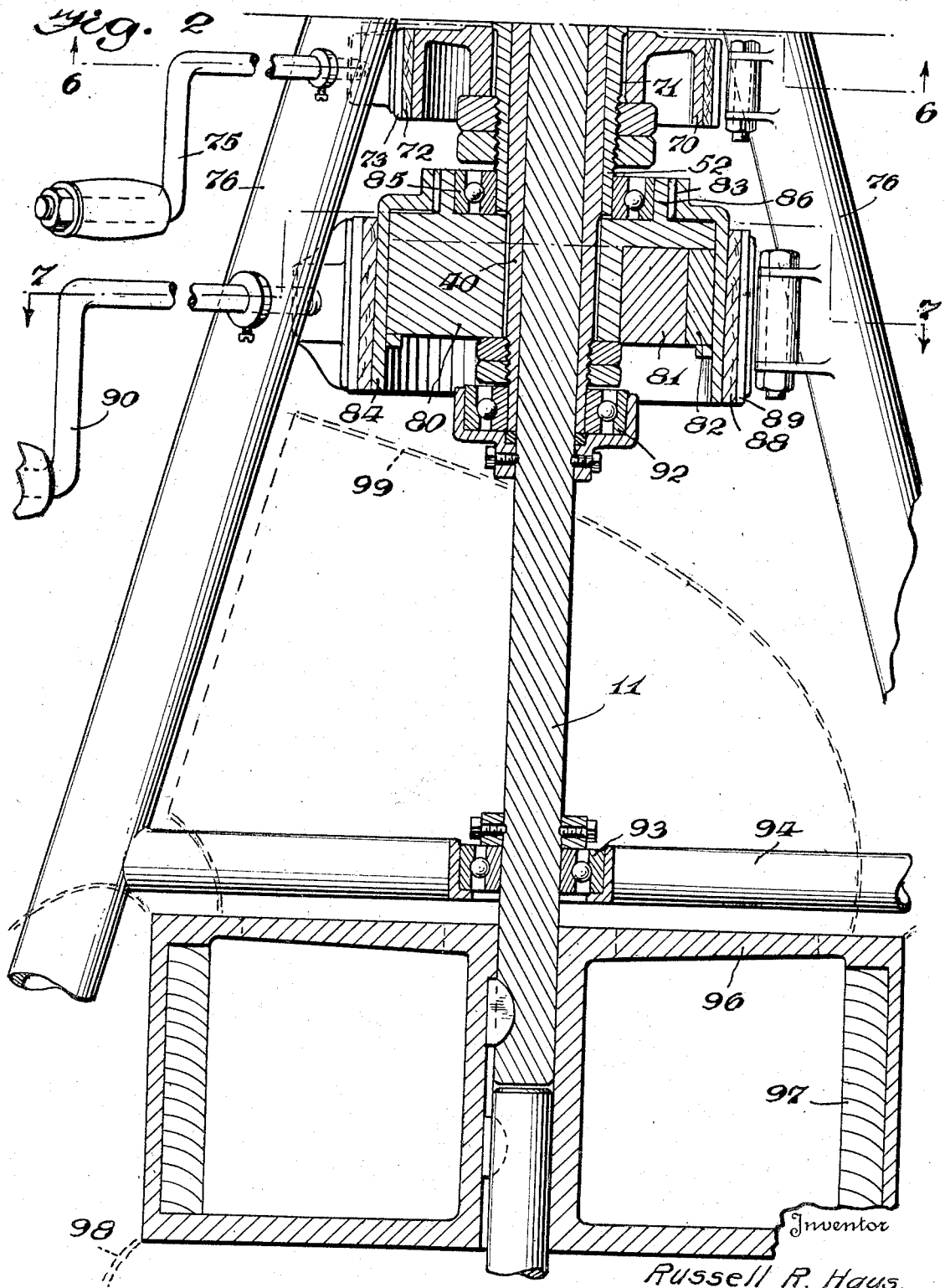

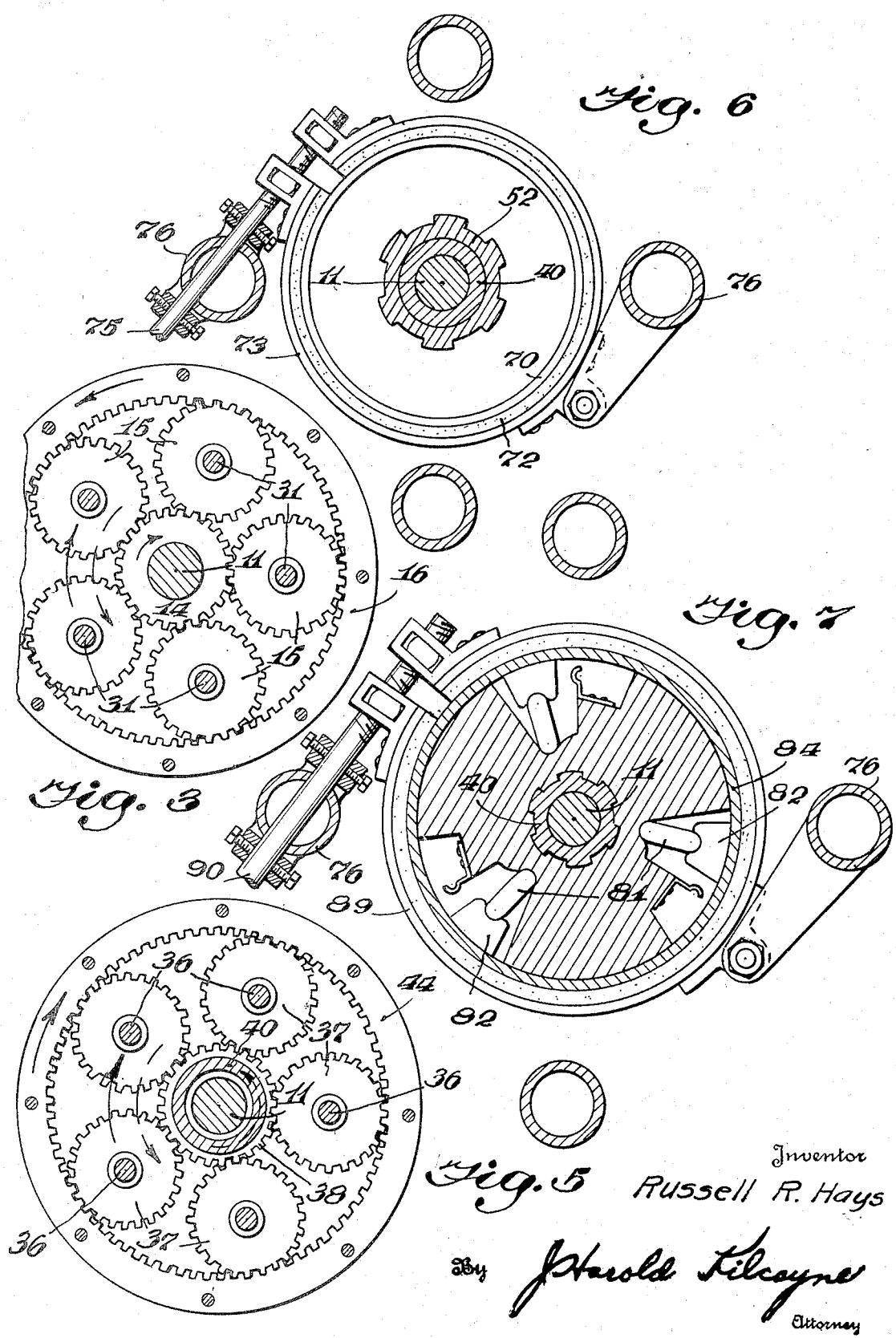

2,402,043

UNITED STATES PATENT OFFICE 2,402,043

HELICOPTER

Russell R. Hays, Lawrence, Kans.

Application July 31, 1943, Serial No. 496,917

11 Claims. (Cl. 74—269)

This invention relates to helicopters, and more particularly to means for transmitting the drive torque of an engine to oppositely turning coaxial lifting propellers.

Since lifting propellers must turn relatively slow as compared with the crankshaft speeds of a conventional aircraft engine, it is plain that the gearing used to transmit the engine torque to the propellers must include speed reduction means as well as drive the propellers in opposite directions. Moreover, a differential means intermediate the two propellers is also desirable since only by such means can the torque of oppositely turning propellers be equalized during all phases of flight, thus preventing the transmission of a torque tending to turn the fuselage of the machine upon which they are mounted. Experience with other types of machinery using an internal combustion engine for motive power indicates the desirability of incorporating a clutch in the power transmission line by which the load can be disconnected to facilitate starting the engine. Moreover, due to the magnitude of the kinetic energy stored in propellers having large spans, such as lifting propellers, provision must be made to dispose of this energy upon failure of the engines; otherwise the propeller's design must incorporate an unduly heavy hub structure. The latter requirement is ideally met by a free wheeling device incorporated in the transmission line intermediate the propellers and the engine.

The foregoing requirements have long been recognized by the designers of coaxial helicopters. The problem then is not so much one of incorporating these elements in such a machine as it is in the manner of their incorporation so as to provide a minimum of weight in conjunction with maximum efficiency. As a matter of fact, all of these elements with the possible exception of free wheeling devices are a part of the conventional automobile. However, with an automotive engine capable of 100 H. P. the combination of a clutch, reduction gearing, differential, and drive shafts, usually runs into several hundred pounds. When it is considered that a 100 H. P. engine for aircraft weighs in the neighborhood of only 250 pounds it is apparent that the concepts of weight acceptable to the automotive industry must be substantially revised for aircraft, and particularly helicopter design.

With these considerations in mind, the object of the present invention is broadly the provision of means for transmitting the drive torque of an engine to oppositely turning coaxial lifting propellers for helicopters and like aircraft capable of vertical ascent, which combines extremely compact speed reduction gearing which through the arrangement of its component parts affords crank shaft speed reductions, opposite rotation of the lifting propellers, and a differential providing equalization of the torque of the oppositely turning propellers, with a clutch, a free wheeling device, a rotor locking brake, and a flywheel, said elements being according to the invention incorporated in a single compact structure weighing less than any arrangement having similar attributes heretofore designed.

Another object is to provide an improved speed reduction gearing for interposition in the drive transmission line for oppositely turning coaxial lifting propellers, which employs two groups of planetary gears and a freely rotative plate interconnecting the respective planetary groups in such manner that power may be transmitted from one group to the other and differentially balanced whereby to provide equal torque to the internal gears of the respective groups regardless of their speed of rotation.

A further object is to provide a compound planetary gearing of novel design and functioning, which incorporates two planetary groups, the internal gears of which are mounted to turn coaxial lifting propellers in opposite directions and with equal torque, and in which power is applied by the engine crankshaft to the sun gear of one planetary group only, the sun gear of the other planetary group being effectively fixed to the fuselage so that the driving torque thereon is zero at all times.

Yet another object of the invention is the provision of a compound planetary system of gearing as aforesaid which is mounted to extend above a pylon structure and in which the shafts carrying the sun gears of both planetary groups and the internal gear of one planetary group are extended below the pylon structure and there provided with means for locking the rotors against rotation when the craft is housed or for stopping them for examination while the engine is still running, with means for clutching and declutching the driving system as a whole and for permitting free wheeling of the rotors in the event of engine failure, and with means serving the dual purpose of cooling the engine and of preventing vibration of the engine being carried up to the planetaries.

Ancillary objectives, such as the provision of a gear box capable of easy lubrication, the arrangement of concentric shafts to provide wellspaced bearing supports and the like, will become more evident from the following description taken with the accompanying drawings, in which:

Fig. 1 is a cross sectional view of a rotor head containing a compound planetary speed reduction gearing according to the invention.

Fig. 2 is a cross sectional view of the concentric shafts extending below the gear box into the sub-pylon structure, and of the elements associated therewith.

Fig. 3 is a view of the upper group of planetary gears taken generally along the line 3—3 of Fig. 1.

Fig. 4 is a like view of the differential plate taken along the line 4—4 of Fig. 1.

Fig. 5 is a similar view taken along the line 5—5 of Fig. 1, showing the arrangement of the lower group of planetary gears.

Fig. 6 is a view taken along line 6—6 of Fig. 2, showing the brake for the shaft carrying the lower internal gear.

Fig. 7 is a view taken along line 7—7 of Fig. 2, showing the free wheeling device and associated friction clutch carried by the lower extension of the shaft for the sun gear of the lower planetary group.

Referring to Figs. 1 and 2, a drive shaft 11 powered by an engine (not shown) extends upwardly through a conventional pylon structure into a rotor head 12, and carries a sun gear 14 at its upper end. This gear meshes with the planet gears 15 of an upper planetary group, which in turn mesh with an internal gear 16 of the same group, the internal gear being fixed to a radial flange 18 carried by the lower end of a hollow driven shaft 20, the upper end of which is keyed to a head 21 carrying stud bolts 22 upon which is mounted the upper rotor (not shown). The planet gears of the upper group are mounted to turn on bolts 31 carried by and extending from the upper face of a differential plate 32, which is mounted to turn freely on an annular bearing 34 concentric with the drive shaft 11. On its opposite face, the differential plate 32 carries bolts 36 symmetrically spaced relative to bolts 31 and on which the planet gears 37 of a lower planetary group are mounted to turn. The planet gears 37 mesh with a lower sun gear 38 which is fixed on a tubular shaft 40 concentric with and containing the drive shaft 11, and with a lower internal gear 44, which is fixed to a gear housing 46. Since in normal flight the shaft 40 is held in a locked position relative to the pylon structure 48, as will be described, the gear housing 46 normally turns in a direction opposite to the upper rotor mounting 21, and with an equal torque. Accordingly, the gear housing 46 is extended downwardly to form a thick shoulder 49 which carries stud bolts 50 on which is mounted the lower rotor (not shown). This shoulder 49 is integral with an outer tubular shaft 52 mounted in outer bearings 54 and 55 carried by the pylon head 48 and which turns relative to shaft 40 on an inner bearing 56. The shaft 52 is concentric with and carries shafts 40 and 11. A flange 58 of the gear housing 46 has fixed to it by bolts 59 a cylindrical case 60 from which extends the upper conical rotor head 12 carrying bearings 61 and 62 in which the upper rotor shaft 20 is mounted.

The shaft 52 extends downwardly into the sub-pylon structure as illustrated in Fig. 2 and adjacent its lower end carries a brake drum 70 on a spline 71. A brake shoe 72 carried by a brake band 73 lies outside and concentric with the brake drum 70 and can be loosened or tightened by means of a crank 75 mounted in a pylon leg 76, Fig. 6. The shaft 40 also extends downwardly into the sub-pylon structure, its lower end which terminates below the brake mechanism being splined to carry the inner element 80 of a conventional free-wheeling unit such as the overrunning clutch generally shown in Fig. 7, of which toggles 81 normally contact shoes 82 and force them against the outer rim 84 of the unit. The inner clutch element is mounted to turn relative to the rim 84 on bearings 83, and relative to the lower end of the shaft 52 on bearings 85, both carried by an upper extension 86 of the inner element. The outer face of the clutch rim 84 is encircled by a conventional friction brake having shoes 88 carried by a brake band 89 which can be tightened or loosened by means of a crank 90 also mounted on the pylon leg 76, this brake normally locking the rim 84 relative to the pylon structure during flight and being released only when starting or stopping the engine.

The lower extension of the drive shaft 11 carries bearings 92 in which the lower end of shaft 40 is mounted and is itself contained in a bottom bearing 93 carried by the cross bars 94 of the pylon. Keyed to the end of the shaft 11 is a conventional centrifugal blower 96 whose rim is weighted as at 97 and which thus serves a dual purpose as a fly wheel and also as a fan supplying an air stream for cooling the engine. This air stream is carried to the engine through suitable conduit 98. An air scoop 99 above the blower looks in the direction of travel of the system and lies between the cross bar members 94 and the free wheeling unit 80, 84.

In operation, as a preliminary to starting the engine, crank 75 is tightened to maintain the lower rotor in a locked position and clutch band 89 is disengaged by loosening the crank 90. This latter releases shaft 40 and permits the sun gear 38 of the lower planetary row to spin freely so that no load is imposed upon starting of the engine. With the engine started, the rotor brake 73 is released by the crank 75 and subsequently the free wheeling unit brake band 89 is tightened by crank 90 until the shaft 40 and sun gear 38 are locked relative to the fuselage. It will be assumed (Fig. 3) that the drive shaft 11 is turning in clockwise direction. Hence, the shaft turns the sun gear 14 keyed to it clockwise, as indicated by the full line arrow, and to the extent that the internal gear 16 resists motion, the differential plate 32 is turned in the same direction through the medium of the bolts 31 upon which the upper row of planet gears are mounted. At the same time, to the extent that the differential plate 32 resists motion, a force is applied to turn the upper internal gear 16 in counterclockwise direction, and with a torque directly proportional to the ratio of the pitch diameter of the internal gear 16 to the pitch diameter of the sun gear 14. Rotation of the differential plate 32 and the bolts 36 mounted in it carries the planet gears of the lower row, Fig. 5, in the same direction of rotation as the drive shaft. Since the lower sun gear 38 is now locked relative to the pylon, rotation of the differential plate consequently acts to rotate the internal gear 44 in the same clockwise direction. Because of the symmetry of form of the two planetary groups it will be obvious that the torque effective upon the internal gears 44 and 16 will be equal and opposite in sign at all times and further that the torque effective upon the sun gear 38 must always equal the torque applied by the sun gear 14 and consequently, the torque reaction on the fuselage of the machine will be zero. It will be understood also that by the proper selection of gear ratios, a desired speed reduction may be obtained.

The immediate effect of increasing the resistance to rotation of either the internal gears 16 or 44 is seen to result directly in an increase of the R. P. M. of the other. It is this fluidity of movement between the respective planetary groups which permits the use of a free wheeling unit such as illustrated to be mounted on the shaft 40. The manner in which this unit operates is as follows: In case of engine failure, the torque effective upon the upper sun gear 14, Fig. 3, ceases and the compression of the engine then resists rotation of the drive shaft 11 and gear 14. However, the internal gear 16, being fast with the upper rotor, continues to turn by reason of the latter's inertia. Due to the resistance of the drive shaft to turning, the internal gear 16 now carries the gears 15 with it and consequently turns the differential plate 32 in the same, i. e. counterclockwise, direction, as indicated by the open arrow. This movement in turn, Fig. 5, is translated through the planet gears 37 of the lower group. Meanwhile, the lower internal gear 44 continues to turn due to the inertia of the lower rotor to which it is affixed. The result is that both the planet gears 37 and the internal gear 44 act to apply a torque upon the sun gear 38 of sign opposite to that imposed when a drive torque was being applied to the upper sun gear 14. When the sun gear 38 has a torque of opposite sign applied to it, it turns in counterclockwise direction to turn shaft 40 in like direction. Counterclockwise rotation of shaft 40 acts to disengage the shoes 82 on the toggles 81 of the free wheeling unit from the rim 84, thus freeing the inner clutch element 80 for movement independently of the rim 84 as is well known in the art. Accordingly, the rotors may now turn freely until the energy stored thereby is suitably disposed of.

When it is desired to interrupt rotation of the rotors, as for the purpose of examining the same, while the engine is left running, clutch band 89 is disengaged by crank 90 and clutch band 73 is engaged by crank 75. Consequently, shaft 40 and sun gear 38 of the lower planetary group spins freely, the shaft 40 turning in clockwise direction so as to maintain the clutch of the free wheeling device engaged, and the lower internal gear 44 is locked to the fuselage. Rotation of the rotors is accordingly stopped with the engine still running. Drive of the rotors is resumed by the reverse operation of the cranks 73, 90.

From the above description, it will be seen that the invention provides an extremely compact speed reduction gearing of a type ideally suited to transmit the engine torque to oppositely turning coaxial lifting propellers in that it drives the propellers in opposite direction and at the same time effects crank shaft speed reductions. By reason of the differential means operating between the groups of planetaries of the aforesaid gearing, it will be observed also that the torque of the oppositely turning propellers is equalized during all phases of flight, so that the transmission of a torque tending to turn the fuselage is prevented. The mounting of the gearing on the pylon in such manner that it extends above the same, with the shafts to the component parts thereof being concentrically arranged and extending into the sub-pylon structure permits of the incorporation or interposition in the transmission line of the various elements of a well-balanced and complete drive system including controls therefor, while at the same time incorporates such elements in compact form and so as to provide a minimum of weight in conjunction with maximum efficiency. Accordingly, it is believed that the objects of the invention are achieved in effective yet simple manner.

As many changes could be made in carrying out the above constructions without departing from the scope of the invention, it is intended that all matter contained in the above description, or shown in the accompanying drawings, shall be interpreted as illustrative and not in a limiting sense.

I claim:

1. Driving mechanism for oppositely turning coaxial lifting propellers comprising, in combination, compound planetary gearing including two planetary groups, each consisting of sun, planet and internal gears and the internal gears of which are each drivingly connected with a propeller, means for transmitting driving torque to the sun gear of one planetary group, releasable means normally locking the sun gear of the other group against rotation, means for locking the internal gear of said other planetary group against rotation and being operative upon release of the first locking means to disconnect the drive through said gearing to said propellers, and means interconnecting the respective planets of the groups in such manner that they are effective normally to transmit equal and opposite driving torques to the internal gears of the groups.

2. Driving mechanism for oppositely turning coaxial lifting propellers comprising, in combination, compound planetary gearing including two planetary groups, each consisting of sun, planet and internal gears and the internal gears of which are each drivingly connected with a propeller, means for transmitting driving torque to the sun gear of one planetary group, means for releasably locking the sun gear of the other group against rotation in like direction as that of the first sun gear upon application of a driving torque thereto and for permitting the sun gear of said other group to turn freely upon application thereto of a torque of opposite sign, means for locking the internal gear of said other planetary group against rotation thereby upon release of the first locking means to disconnect the drive through said gearing to said propellers, and means interconnecting the respective planets of the group in such manner that they are effective to transmit equal and opposite driving torques to the internal gears of the groups.

3. Driving mechanism for oppositely turning coaxial lifting propellers comprising, in combination, an upright supporting structure, compound planetary gearing supported from and disposed above the structure and including two planetary groups, each consisting of sun, planet and internal gears and the internal gears of which are each drivingly connected with a driven element, and means for rendering the respective planets interactive, concentric shafts carried in bearings in said supporting structure and extending from below said structure to said gearing, one of said shafts being operative to transmit driving torque to the sun gear of one planetary group, a second shaft being driven by the internal gear of the other planetary group, and an intermediate shaft having a connection with the sun gear of said other planetary group.

4. Driving mechanism as set forth in claim 7, wherein the internal gear of said other planetary group carries a rotatable housing for said gearing to which said second shaft is fixed for rotation therewith.

5. Driving mechanism as set forth in claim 7, wherein the internal gear of said other planetary group carries a rotatable housing for said gearing in which a shaft driven by the internal gear of the first planetary group and in turn driving the upper propeller is supported in bearings.

6. Driving mechanism as set forth in claim 7, wherein the internal gear of said other planetary group carries a rotatable housing having a downward extension providing a mount for the lower driven element, and from which said second shaft extends, and an upward extension in which a shaft driven by the internal gear of the first planetary group and in turn driving the upper driven element is supported in bearings.

7. Driving mechanism as set forth in claim 7, wherein said supporting structure carries means for releasably locking the second shaft against rotation.

8. Driving mechanism for oppositely turning coaxial propellers comprising, in combination, a driving shaft, a first sun gear on said shaft, a second shaft surrounding said drive shaft, a second sun gear mounted on said second shaft, compound planetary gearing including two planetary groups, each consisting of one of the aforesaid sun gears and intermeshing planet and internal gears and the internal gears of which are each drivingly connected with a propeller, means for transmitting driving torque to the first mentioned sun gear, means contained between the groups for interconnecting the respective planets of both groups in such a manner that they are effective to transmit equal and opposite driving torques to the internal gears of both groups, and means to selectively restrain said second sun gear from rotation.

9. Driving mechanism for oppositely turning coaxial propellers comprising, in combination, a driving shaft, a first sun gear on said shaft, a second shaft surrounding said drive shaft, a second sun gear mounted on said second shaft, compound planetary gearing including two planetary groups, each consisting of one of the aforesaid sun gears and intermeshing planet and internal gears and the internal gears of which are each drivingly connected with a propeller, means for transmitting driving torque to the first mentioned sun gear, means contained between the groups for interconnecting the respective planets of both groups in such a manner that they are effective to transmit equal and opposite driving torques to the internal gears of both groups, and means to selectively restrain said second sun gear from rotation including a brake and over-running clutch means.

10. Driving mechanism for oppositely turning coaxial propellers comprising, in combination, a driving shaft, a first sun gear on said shaft, a second shaft surrounding said drive shaft, a second sun gear mounted on said second shaft, compound planetary gearing including two planetary groups, each consisting of one of the aforesaid sun gears and intermeshing planet and internal gears and the internal gears of which are each drivingly connected with a propeller, means for transmitting driving torque to the first mentioned sun gear, means contained between the groups for interconnecting the respective planets of both groups in such a manner that they are effective to transmit equal and opposite driving torques to the internal gears of both groups, braking means for restraining rotation of one of said internal gears, and means to selectively restrain said second sun gear from rotation.

11. Driving mechanism for oppositely turning coaxial propellers comprising, in combination, a driving shaft, a first sun gear on said shaft, a second shaft surrounding said drive shaft, a second sun gear mounted on said second shaft, compound planetary gearing including two planetary groups, each consisting of one of the aforesaid sun gears and intermeshing planet and internal gears and the internal gears of which are each drivingly connected with a propeller, means for transmitting driving torque to the first mentioned sun gear, means contained between the groups for interconnecting the respective planets of both groups in such a manner that they are effective to transmit equal and opposite driving torques to the internal gears of both groups, brake means for one of said internal gears, and a combined over-running clutch and brake for said second shaft operatively mounted upon the latter shaft.

RUSSELL R. HAYS.